United States Patent
Uchiyama

(10) Patent No.: US 9,874,787 B2
(45) Date of Patent: Jan. 23, 2018

(54) LIQUID CRYSTAL DISPLAY DEVICE FOR PREVENTING DISPLACEMENT BETWEEN TWO SUBSTRATES

(71) Applicant: Japan Display Inc., Tokyo (JP)

(72) Inventor: Masaru Uchiyama, Tokyo (JP)

(73) Assignee: Japan Display Inc., Tokyo (JP)

(*) Notice: Subject to any disclaimer, the term of this patent is extended or adjusted under 35 U.S.C. 154(b) by 83 days.

(21) Appl. No.: 14/790,575

(22) Filed: Jul. 2, 2015

(65) Prior Publication Data
US 2016/0004115 A1 Jan. 7, 2016

(30) Foreign Application Priority Data
Jul. 2, 2014 (JP) .................................. 2014-136790

(51) Int. Cl.
*G02F 1/1339* (2006.01)
*G02F 1/1362* (2006.01)

(52) U.S. Cl.
CPC .... *G02F 1/13394* (2013.01); *G02F 1/136286* (2013.01); *G02F 2001/13396* (2013.01); *G02F 2001/13398* (2013.01)

(58) Field of Classification Search
CPC combination set(s) only.
See application file for complete search history.

(56) References Cited

U.S. PATENT DOCUMENTS

2012/0169977 A1* 7/2012 Tsubata .................. G02B 5/201
  349/106
2013/0235294 A1* 9/2013 Nomura ................ G02F 1/1339
  349/43

FOREIGN PATENT DOCUMENTS

JP 2013-186148 A 9/2013

* cited by examiner

*Primary Examiner* — Lauren Nguyen
(74) *Attorney, Agent, or Firm* — Typha IP LLC

(57) ABSTRACT

Provided is a liquid crystal display device including a first spacer and a second spacer, which reduces the amount of residual displacement between a TFT substrate and a counter substrate after an external force applied to the liquid crystal display device has been removed, The first spacer, as seen in plan view, has an octagonal shape of a special form with a long axis in a direction of its gate lines, is planar in section at a central section thereof, and includes an inclined section on both sides. The second spacer has an octagonal shape of a special form with a long axis in a perpendicular direction relative to the gate lines, is planar in section at a central section thereof, and includes an inclined section on both sides. A gap between the TFT substrate and the counter substrate is defined by the first spacer and the second spacer.

11 Claims, 12 Drawing Sheets

FIG. 14
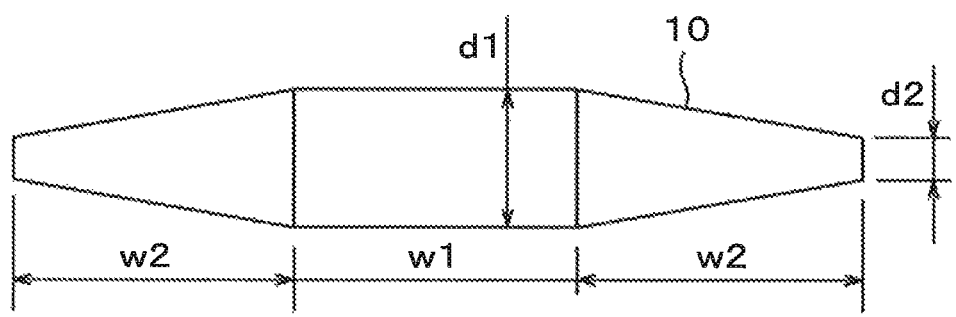
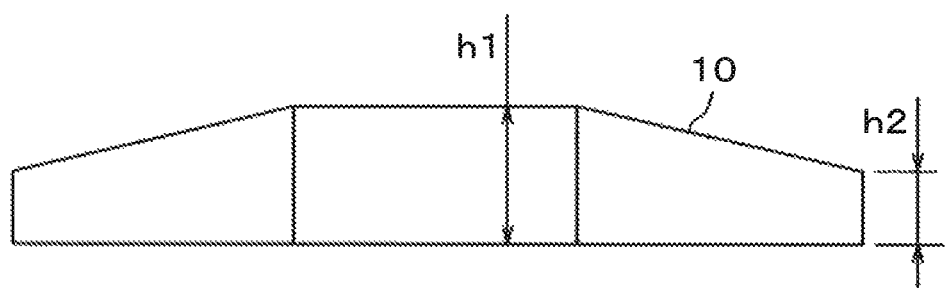

LIQUID CRYSTAL DISPLAY DEVICE FOR PREVENTING DISPLACEMENT BETWEEN TWO SUBSTRATES

CLAIM OF PRIORITY

The present application claims priority from Japanese Patent Application JP 2014-136790 filed on Jul. 2, 2014, the content of which is hereby incorporated by reference into this application.

BACKGROUND OF THE INVENTION

1. Field of the Invention

The present invention relates generally to liquid crystal display devices. More particularly, the invention is directed to liquid crystal display devices including preventive measures against changes in gap between substrates and against displacement of the substrates in directions of respective principal planes, the display devices further containing a necessary measure to prevent spacers from damaging alignment films.

2. Description of the Related Art

In liquid crystal display devices, a thin-film transistor (TFT) substrate, on which a pixel electrode, thin-film transistors (TFTs), and other elements are formed in a matrix format, and a counter substrate are arranged with liquid crystals sandwiched between the TFT substrate and the counter substrate. A transmittance of the light, as passed through the liquid crystal molecules, is controlled on a pixel-by-pixel basis to form an image. On both the TFT substrate and the counter substrate, an alignment film for initially aligning the liquid crystals is formed on the contact surface where the substrate comes into contact with the liquid crystals.

A method of forming a columnar spacer below the counter substrate is used to prevent changes in distance (hereinafter referred to as the gap) between the TFT substrate and the counter substrate; that is, changes in layer thickness of the liquid crystals. After the liquid crystal display device has been fabricated to completion, an external pressure applied to the counter substrate during operation of the device shifts both the TFT substrate and the counter substrate to the directions of respective principal planes (hereinafter, these relative shifts will be referred to simply as the displacement of the TFT substrate and the counter substrate). Forming the columnar spacer only below the counter substrate to control the gap often poses a problem in that the columnar spacer has its distal end damaging the alignment film formed over the TFT substrate.

To deal with this problem a configuration with both a columnar spacer provided below a counter substrate and a columnar spacer support base disposed above a TFT substrate is developed to control the gap between both substrates (the columnar spacer support base will hereinafter be referred to simply as the base). Since only a very thin alignment film is formed on the base, although the alignment film may be damaged by the columnar spacer, adverse effects of the damage will be insignificant. The columnar spacer used in this case would be circular or square in a shape of a planar section and trapezoidal in section, and the base would also have a planar shape that fits the planar shape of the columnar spacer.

Nonetheless, other problems may arise. One problem is that if the counter substrate and the TFT substrate are significantly displaced, the columnar spacer may fall off the base, thus damaging the alignment film in a display region. Another problem is that even after the external force upon the liquid crystal display device has been removed, the columnar spacer may become stuck in the base and fail to return to an original position in the base, which may then keep the counter substrate and the TFT substrate out of alignment.

JP-2013-186148-A describes a configuration in which two spacers, one close to a counter substrate and the other to a TFT substrate, having a rectangular plane and offset by 90 degrees in an angle of a long axis relative to each other are arranged to prevent an event of a columnar spacer falling off a base.

SUMMARY OF THE INVENTION

Application of an external force to the liquid crystal display device makes the counter substrate and the TFT substrate out of alignment, thus resulting in the columnar spacer displaced from the base. Once the external force has been removed, however, restoring force works upon the upper and lower substrates in an attempt to correct the displacement. In other words, the columnar spacer that has been displaced together with the substrates exerts a restoring force upon itself so as to return to its original position.

However, although the columnar spacer that has been displaced attempts to return to the original position, friction against the alignment film close to the columnar spacer may prevent the spacer from fully returning, and consequently a certain degree of displacement may remain. This displacement will hereinafter be referred to as the residual displacement. If the residual displacement is too significant, it will cause unintended color mixing between adjacent pixels. Specific pixels on the TFT substrate correspond to specific colors of color filters present on the counter substrate. If the TFT substrate and the counter substrate become displaced, however, not only does light that passes through specific pixels present on the TFT substrate pass through originally corresponding color filters, but a part of the light might pass through adjacent color filters and if this actually happens, color purity will deteriorate.

If there is too significant a residual displacement, unintendedly mixed colors would remain after the external force upon the liquid crystal display device has been removed. An object of the present invention is to reduce such a residual displacement to a level at which unintended color mixing does not occur, and thereby prevent the unintended color mixing.

The present invention overcomes the foregoing problems, typically by employing the following means.

(a) A liquid crystal display device includes:
a TFT substrate including pixels formed in regions bounded by gate lines and data lines;
a counter substrate facing the TFT substrate; and
a liquid crystal sandwiched between the TFT substrate and the counter substrate;
the TFT substrate having a first spacer,
as seen in plan view, the first spacer including:
a central section having a long axis and a constant width in a direction of the long axis;
a first inclined section progressively decreasing in width from the central section toward a distal end of the first inclined section in the direction of the long axis; and
a second inclined section progressively decreasing in width from the central section toward a distal end of the second inclined section in the direction of the long axis;
wherein, as seen in section, the central section has a constant height, the first inclined section progressively decreases in height from the central section toward the distal end in the direction of the long axis, and the second inclined section progressively decreases in height from the central section toward the distal end in the direction of the long axis, the counter substrate having a second spacer, as seen in plan view, the second spacer including:

a central section having a long axis and a constant width in a direction of the long axis;

a third inclined section progressively decreasing in width from the central section toward a distal end of the third inclined section in the direction of the long axis; and a fourth inclined section progressively decreasing in width from the central section, toward a distal end of the fourth inclined section in the direction of the long axis, wherein, as seen in section, the central section has a constant height, the third inclined section progressively decreases in height from the central section toward the distal end in the direction of the long axis, and the fourth inclined section progressively decreases in height from the central section toward the distal end in the direction of the long axis, wherein the long axis of the first spacer and that of the second spacer together form an angle of 90 degrees; and wherein a gap between the TFT substrate and the counter substrate is defined by the first spacer and the second spacer.

(b) The liquid crystal display device according to above item (a), wherein in a case that the TFT substrate or the counter substrate is not displaced, the central section of the first spacer and that of the second spacer faces each other.

(c) The liquid crystal display device according to item (a), wherein the first spacer is formed at an intersection of one of the gate lines and one of the data lines, the one of the gate lines extending in the direction of the long axis of the first spacer.

(d) The liquid crystal display device according to item (a), wherein the height of the first spacer at the central section thereof is the same as the height of the second spacer at the central section thereof.

(e) The liquid crystal display device according to item (a), wherein the height of the second spacer at the central section thereof is greater than the height of the first spacer at the central section thereof.

(f) The liquid crystal display device according to item (a), wherein, when the first spacer is seen in plan view, assuming the width of the central section as d1 and the width of the distal ends of the first inclined section and second inclined section in the direction of the long axis as d2, then $d1/3 \leq d2 < d1$ holds, and wherein, when the second spacer is seen in plan view, assuming the width of the central section as d3 and the width of the distal ends of the third inclined section and fourth inclined section in the direction of the long axis as d4, then $d3/3 \leq d4 < d3$ holds.

(g) The liquid crystal display device according to above item (f), wherein the widths d1 and d3 are equal, and the widths d2 and d4 are equal.

(h) The liquid crystal display device according to item (a), wherein, when the first spacer is seen in section, assuming the height of the central section as h1 and the height of the distal ends of the first inclined section and second inclined section in the direction of the long axis as h2, then $h1/3 \leq h2 < h1$ holds, and wherein, when the second spacer is seen in section, assuming the height of the central section as h3 and the height of the distal ends of the third inclined section and fourth inclined section in the direction of the long axis as h4, then $h3/3 \leq h4 < h3$ holds.

(i) The liquid crystal display device according to above item (h), wherein the heights h1 and h3 are equal, and the heights h2 and h4 are equal.

BRIEF DESCRIPTION OF THE DRAWINGS

FIG. 14 is a plan view and side view showing exemplary dimensions of the spacers in the embodiment of the present invention.

DESCRIPTION OF THE PREFERRED EMBODIMENT

An embodiment of the present invention will be described in detail below.

First Embodiment

Figure 1:
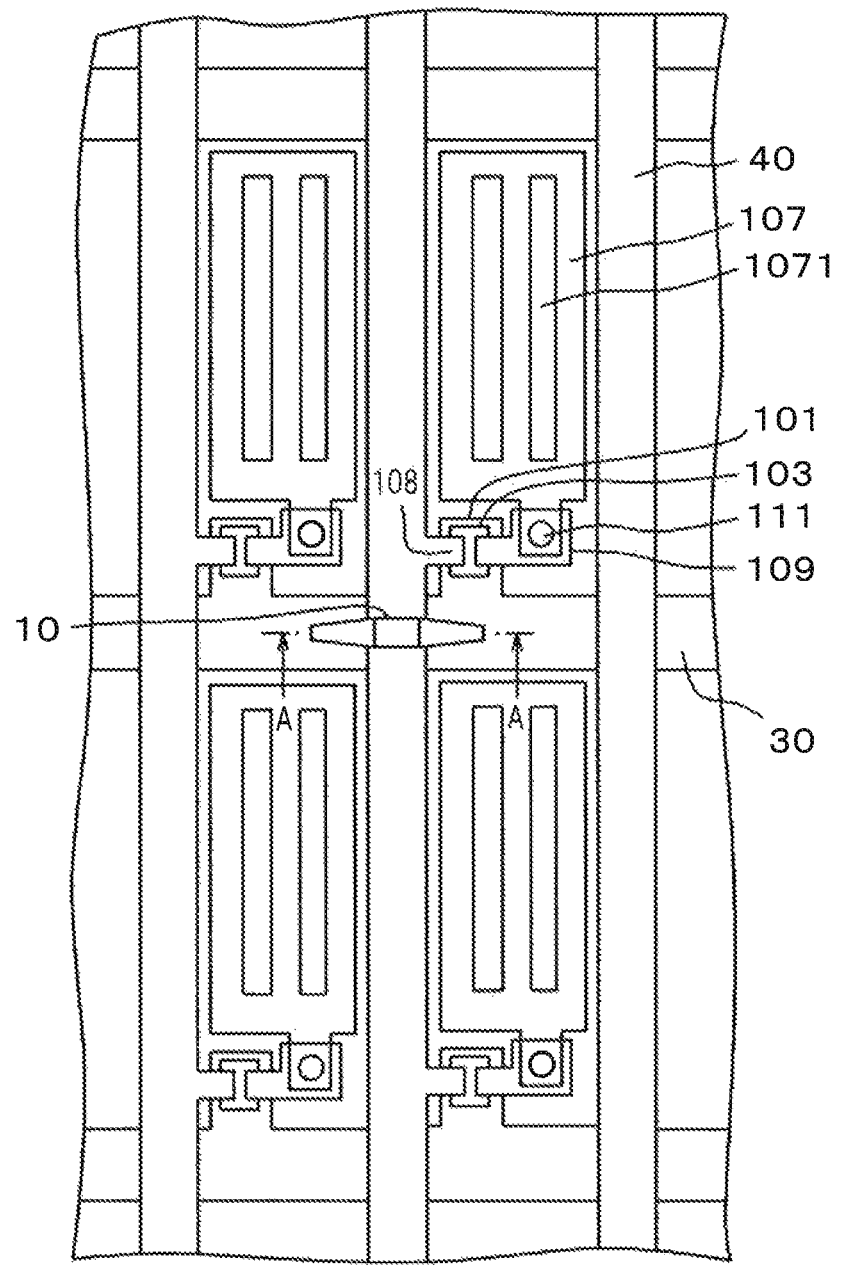
FIG. 1 is a plan view of a TFT substrate in a liquid crystal display device according to an embodiment of the present invention.

FIG. 1 is a plan view of a TFT substrate 100 in a liquid crystal display device according to an embodiment of the present invention. Referring to FIG. 1, gate lines 30 extending in a horizontal direction are arrayed at predetermined pitches in a vertical direction. In addition, data lines 40 extending in the vertical direction are arrayed in the horizontal direction. Pixels are formed in regions bounded by the gate lines 30 and the data lines 40. The liquid crystal display device of the present embodiment is of the so-called In-Plane Switching (IPS) scheme. While the present invention will be described taking a liquid crystal display device of the IPS scheme as an example, the invention is not limited to the IPS scheme and can also be applied to liquid crystal display devices of other schemes, such as Twisted Nematic (TN) and Vertical Alignment (VA).

Referring again to FIG. 1, thin-film transistors (TFTs) are formed at lower right sections of pixels. Each TFT includes a semiconductor layer 103 formed via a gate-insulating film 102 over a gate electrode 101 branched from a gate line 30. On the semiconductor layer 103, a drain electrode 108 and a source electrode 109, both branched from a data line 40, are facing each other with a channel region formed between both electrodes. An inorganic passivation film 104 is formed over the data line 40, the drain electrode 108, and the source electrode 109. On the inorganic passivation film 104, a common electrode 105 that is common to each pixel is formed in a flat shape. On the common electrode 105 is formed an interlayer insulating film 106, on which a pixel electrode 107 with slits 1071 is further formed.

The pixel electrode 107 connects to the source electrode 109 via a through-hole 111 extending through the inorganic passivation film 104 to the interlayer insulating film 106, and the pixel electrode 107 receives a video signal via the TFT. When voltage is applied to the pixel electrode 107, electric lines of force that are oriented toward the common electrode 109 through the slits 1071 in the pixel electrode 107 are generated between the pixel electrode 107 and the common electrode 105 via a liquid crystal layer 300. Liquid crystal molecules of the liquid crystal layer 300 rotate using an action of the electric lines of force, thereby controlling the amount of light emitted from a backlight through the liquid crystal layer 300.

A spacer is formed at an intersection of the gate line 30 and the data line 40. This spacer is hereinafter referred to as the lower spacer 10. The lower spacer 10 has an octagonal plane of a special form that is elongated in a transverse direction. The lower spacer 10 also includes a planar section at its center and an inclined section on both sides as shown in FIG. 3.

Figure 2:
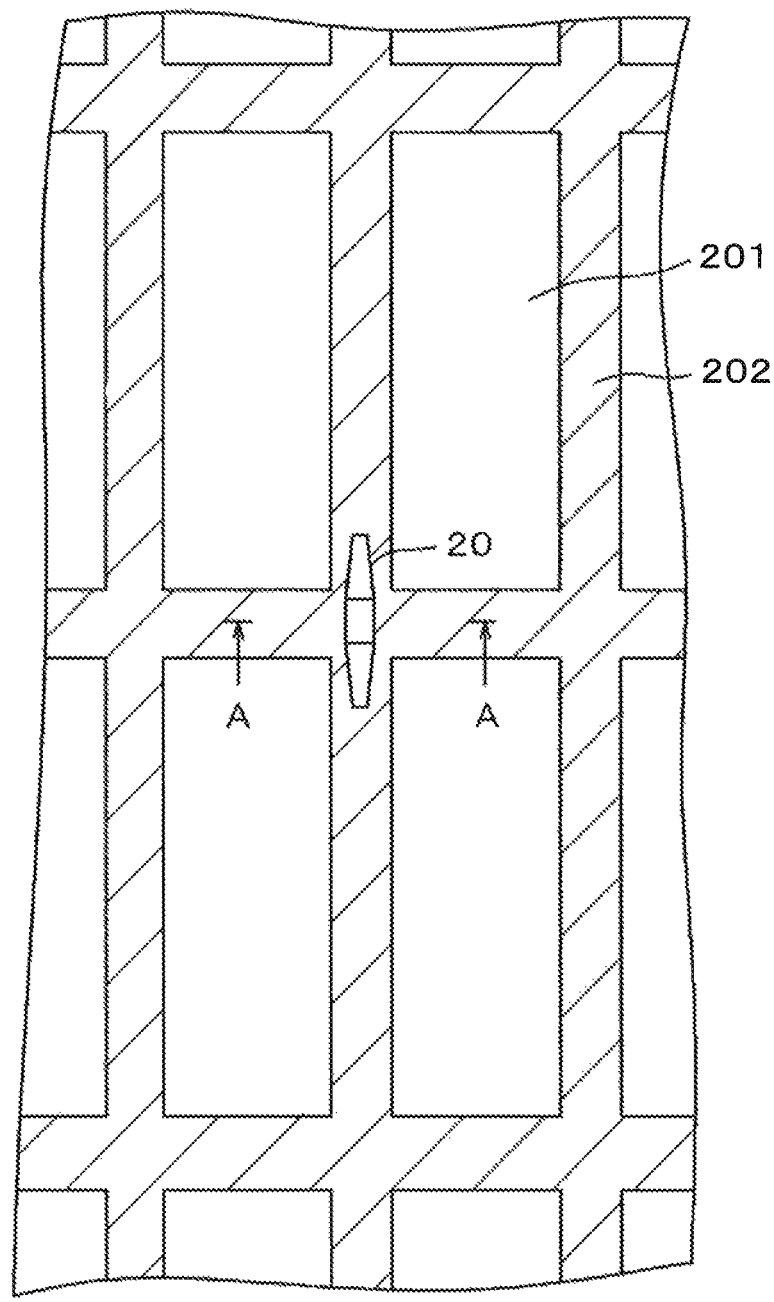
FIG. 2 is a plan view of a counter substrate in the liquid crystal display device according to the embodiment of the present invention.

FIG. 2 is a plan view of the counter substrate 200 as viewed from the liquid crystal layer side. A black matrix 202 is formed at a section of the TFT substrate 100 that corresponds to the gate line 30 and the data line 40. A color filter 201 is formed in a region bounded by the black matrix. An upper spacer 20 is formed at a section corresponding to the lower spacer 10 in FIG. 1. In the plan view of FIG. 2, the upper spacer 20 includes an octagonal plane section of a special form having the same long axis as that of the lower spacer, but the long axis of the upper spacer differs from that of the lower spacer in that the former extends in a vertical direction.

Similarly to the lower spacer 10, the upper spacer 20 includes a planar section at its center and an inclined section on both sides. When the counter substrate 200 and the TFT substrate 100 are combined, the planar sections of the upper spacer 20 and the lower spacer 10 come into contact with each other to define a gap present between the TFT substrate 100 and the counter substrate 200.

Figure 3:
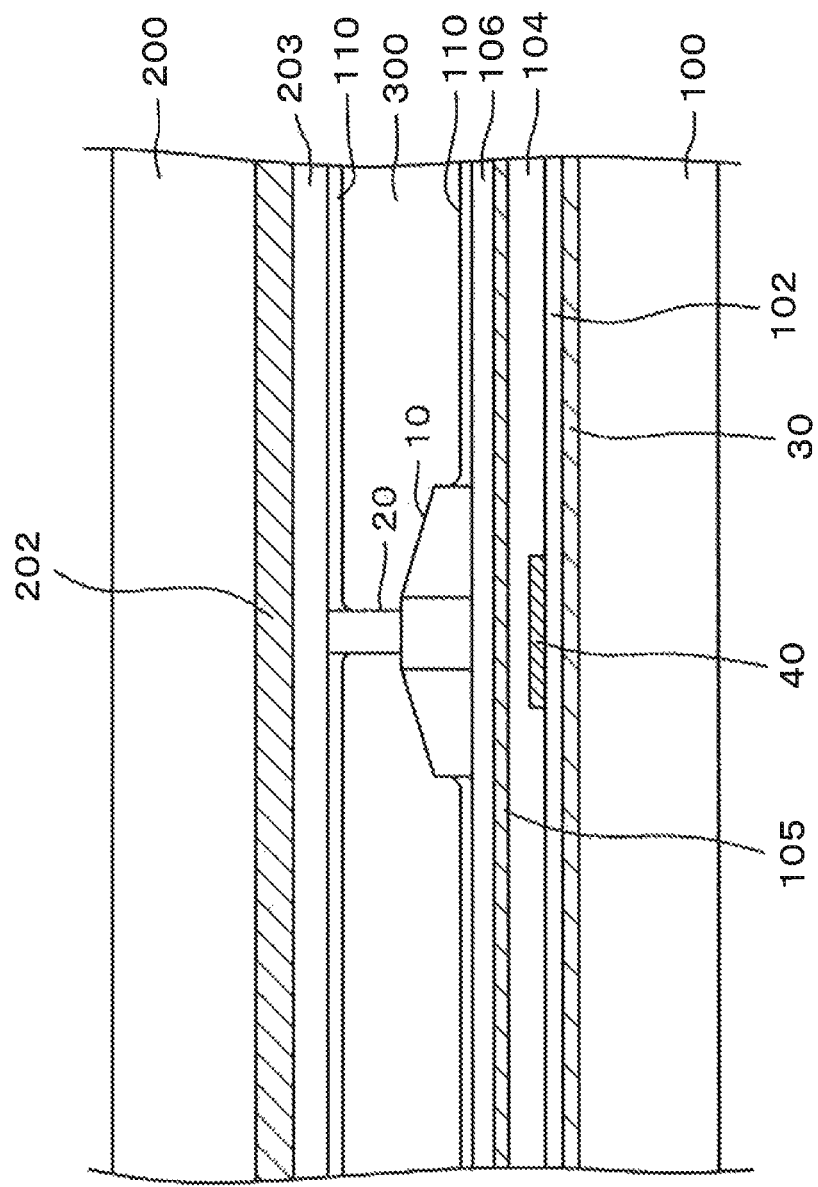
FIG. 3 is a sectional view of the liquid crystal display device according to the embodiment of the present invention.

FIG. 3 is a sectional view of the liquid crystal display device that corresponds to section A-A in FIG. 1, the sectional view showing a state of the display device having liquid crystals injected inside after the combination of the TFT substrate 100 and the counter substrate 200. Referring to FIG. 3, agate line 30 extends along an upper surface of the TFT substrate and a gate-insulating film 102 is on the gate line 30. A data line 40 that intersects with the gate line 30 extends in a perpendicular direction relative to the sheet of FIG. 3. A passivation film 104 formed from silicon mononitride (SiN) or other material is over the data line 40, and a common electrode 105 is formed in a flat shape over the passivation film 104.

An interlayer insulating film 106 formed from SiN or other material is formed on the common electrode 105, and the lower spacer 10 is formed on the interlayer insulating film 106. Since FIG. 3 shows the gate line 30 and others over the line, no pixel electrodes 107 are shown in the figure. An alignment film 110 is formed over the interlayer insulating film 106. Although another alignment film 110 is actually formed over the lower spacer 10, this alignment film is omitted from FIG. 3, for it is thinned by leveling.

The counter substrate 200 is disposed at an opposite side across the liquid crystal layer 300. A color filter 201 and a black matrix 202 are formed on the counter substrate 200. The black matrix 202 is formed over the gate line 30, and thus a color filter is absent in A-A sectional view. An overcoat film 203 is formed over the black matrix 202. An upper spacer 20 is formed on the overcoat film 203. As shown in FIG. 2, section A-A of the upper spacer 20 is rectangular. One alignment film 110 is formed over the overcoat film 203. Although another alignment film 110 is actually formed on the upper spacer 20, this alignment film is omitted from FIG. 2, for it is thinned by leveling. As shown in FIG. 3, the gap between the TFT substrate 100 and the counter substrate 200 is defined by the upper spacer 20 and the lower spacer 10.

Figure 4:
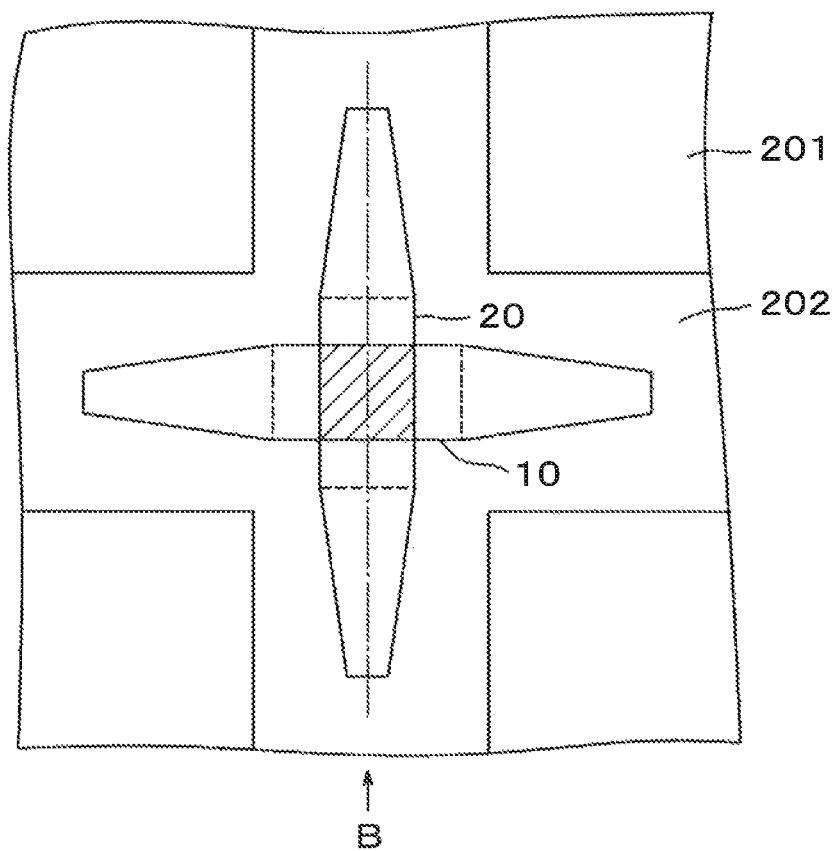
FIG. 4 is a plan view showing a state in which an upper spacer and a lower spacer, the former stacked on the latter, are arranged in the liquid crystal display device according to the embodiment of the present invention.

FIG. 4 is a plan view showing the upper spacer 20 and lower spacer 10 as viewed from above when the former is placed upon the latter. The color filter 201 and black matrix 202 in FIG. 4 are depicted to show positions of the upper spacer 20 and the lower spacer 10 relative to those of the color filter and the black matrix. As shown, the upper spacer 20 and the lower spacer 10 are formed where the black matrix 202 is arranged.

Figure 5:
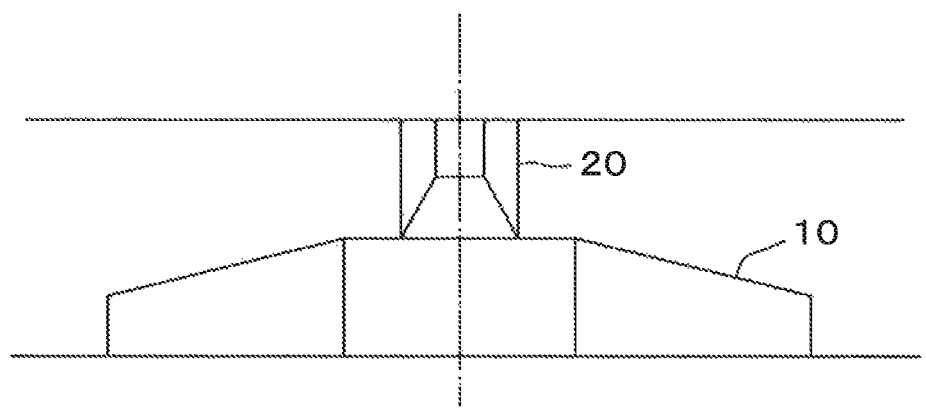
FIG. 5 is a side view showing the state where the upper spacer and the lower spacer, the former stacked on the latter, are arranged in the liquid crystal display device according to the embodiment of the present invention.

Long axes of the upper spacer 20 and the lower spacer 10 together form an angle of 90 degrees. The shaded section in the figure is where the upper spacer 20 and the lower spacer 10 are in contact with each other and the gap between the TFT substrate 100 and the counter substrate 200 is defined. FIG. 5 is a side view of the spacers shown in FIG. 4, seen from direction B. FIGS. 4 and 5 both show that there is no displacement between the TFT substrate 100 and the counter substrate 200.

Figure 6:
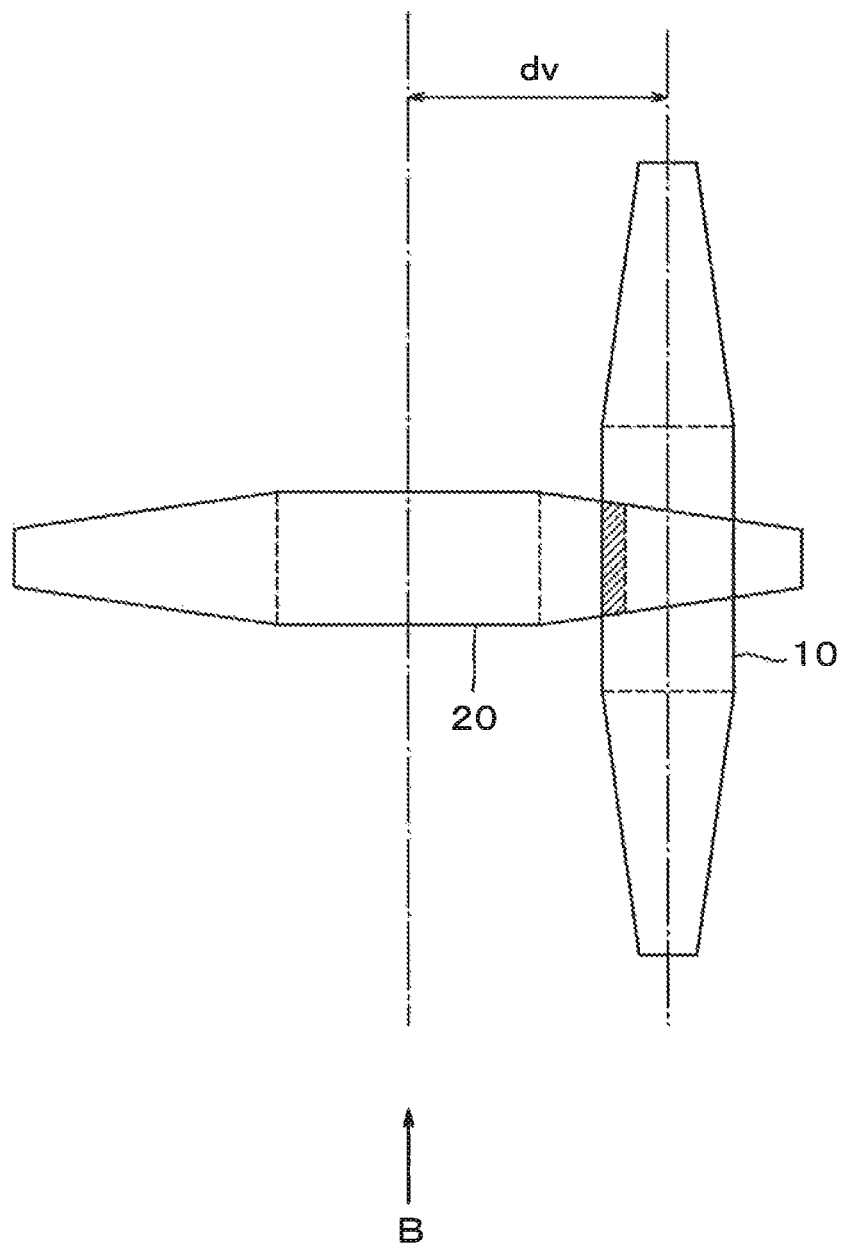
FIG. 6 is a plan view representing a positional relationship between the upper spacer and lower spacer in the embodiment of the present invention in the event that the counter substrate becomes displaced from the TFT substrate.

FIG. 6 is a plan view representing a positional relationship between the upper spacer 20 and lower spacer 10 in the event that the counter substrate 200 deviates through a distance of 'dv' rightward with respect to the TFT substrate. The upper spacer 20 in FIG. 6 is displaced to an inclined section of the lower spacer 10. As this inclined section of the lower spacer 10 goes rightward, the width of the inclined section progressively decreases, so that the width in this inclined section where the upper spacer 20 and lower spacer 10 come into contact is smaller than that in the planar sections of the spacers.

Figure 7:
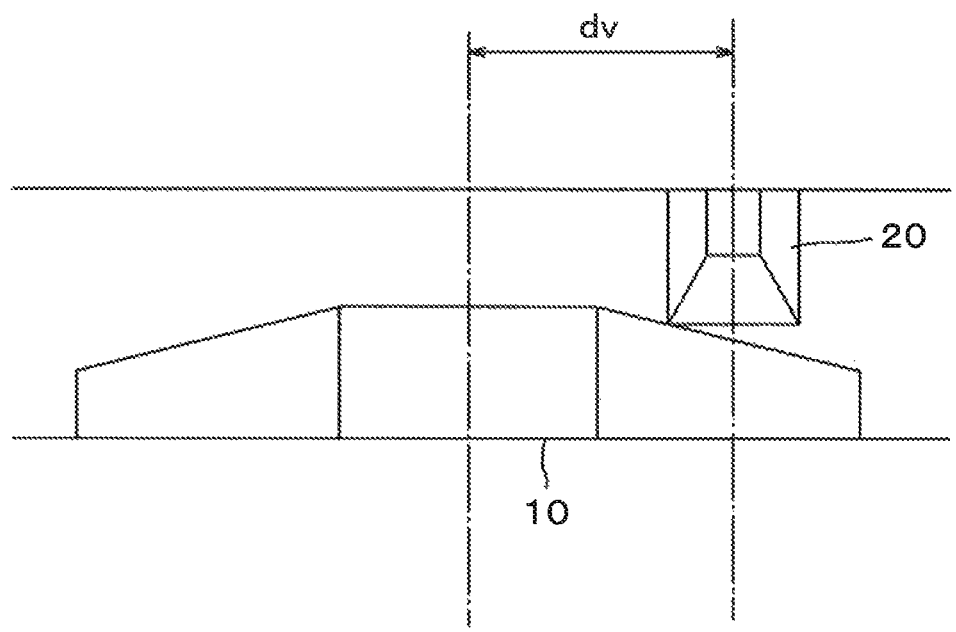
FIG. 7 is a side view representing the positional relationship between the upper spacer and lower spacer in the embodiment of the present invention in the event that the counter substrate becomes displaced from the TFT substrate.

FIG. 7 is a side view of the spacers, seen from direction B in FIG. 6. The upper spacer 20 in FIG. 7 is in contact with an inclined section of the lower spacer 10. Part of the planar section of the upper spacer 20 at this inclined section, not an entire surface of the upper spacer 20, is in contact with the inclined section of the lower spacer 10. When one or both of the upper spacer 20 and the lower spacer 10 are displaced, only the hatched section in FIG. 6 is where the upper spacer 20 and the lower spacer 10 are in contact.

Figure 8:
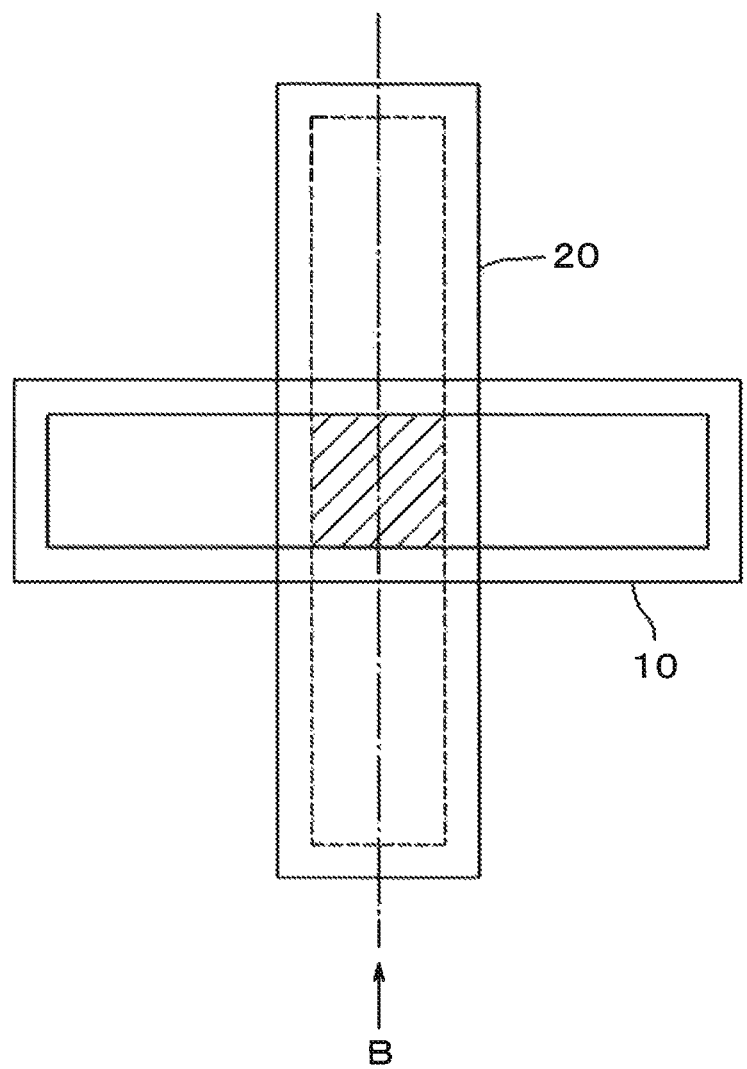
FIG. 8 is a plan view showing a state in which an upper spacer and a lower spacer, the former stacked on the latter, are arranged in an example of a conventional liquid crystal display device.

FIG. 8 is a plan view showing an upper spacer 20 and a lower spacer 10 being arranged, the former being stacked on the latter, in an example of a conventional liquid crystal display device and defining a gap between a TFT substrate 100 and a counter substrate 200. The TFT substrate 100 and the counter substrate 200 in FIG. 8 are not displaced. The area where the TFT substrate 100 and counter substrate 200 are in contact in FIG. 8 is hatched.

Figure 9:
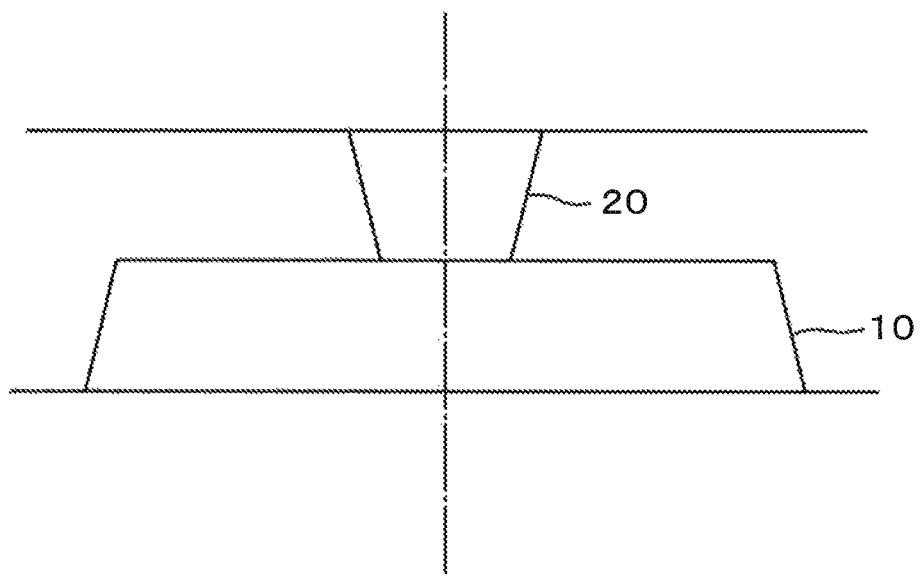
FIG. 9 is a side view showing the state where the upper spacer and the lower spacer, the former stacked on the latter, are arranged in the example of the conventional liquid crystal display device.

FIG. 9 is a side view of the spacers, seen from direction B in FIG. 8. The upper spacer 20 and the lower spacer 10 are trapezoidal in section. The slopes of the trapezoids in FIG. 9, however, are sharp, in which sense the upper spacer 20 and the lower spacer 10 in FIG. 9 are different from those of the present invention. This means that the conventional example does not have a concept to utilize the slopes of the trapezoids. In other words, the upper spacer 20 will drop off of the lower spacer 10 if the upper spacer 20 slides from an upper edge of the trapezoid in section of the lower spacer 10. In the conventional example, therefore, the slopes of the trapezoids is preferably as sharp as possible, and spacers having slopes of 90 degrees in angle to become rectangular in section are most preferable in terms of space factor.

Figure 10:
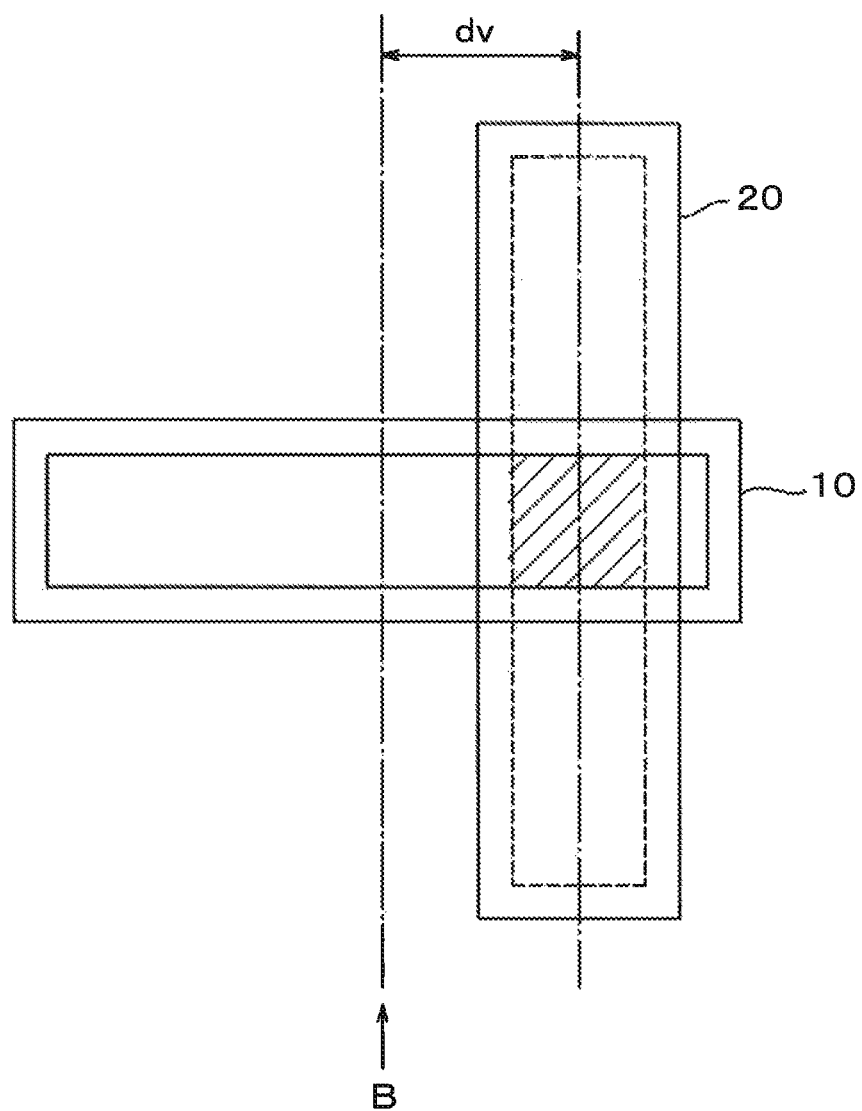
FIG. 10 is a plan view representing a positional relationship between the upper spacer and lower spacer in the example of the conventional liquid crystal display device in the event that the counter substrate becomes displaced from the TFT substrate.
Figure 11:
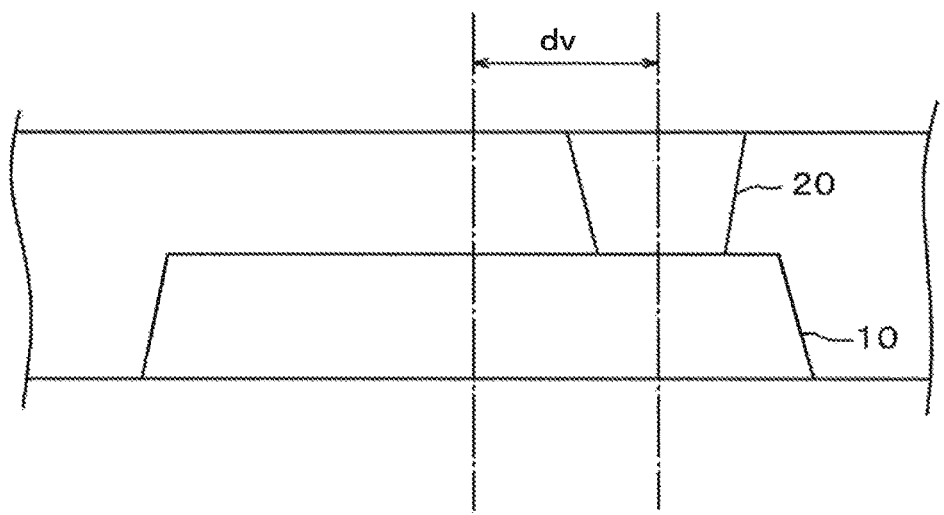
FIG. 11 is a side view representing the positional relationship between the upper spacer and lower spacer in the example of the conventional liquid crystal display device in the event that the counter substrate becomes displaced from the TFT substrate.

FIG. 10 is a plan view of the upper spacer 20 and lower spacer 10 in the conventional example in the event that the counter substrate 200 deviates through a distance of 'dv' rightward with respect to the TFT substrate 100. The area where the upper spacer 20 and lower spacer 10 are in contact in FIG. 10 is hatched. FIG. 11 is a side view of the spacers, seen from direction B in FIG. 10. As shown in FIGS. 10 and 11, the upper spacer 20 and lower spacer 10 in the conventional example remain the same in contact area even after the counter substrate 200 has deviated with respect to the TFT substrate 100.

Application of a finger pressure or some other mechanical pressure from the outside to the counter substrate 200 in the liquid crystal display device displaces the counter substrate 200 with respect to the TFT substrate 100, and at the same time, also makes the upper spacer 20 out of alignment from the lower spacer 10. Once the external force has been released, the TFT substrate 100 and the counter substrate 200 make an attempt to return to be aligned. This force is hereinafter called the restoring force. Since the upper spacer 20 and the lower spacer 10 are in contact, however, a frictional force between the spacers works as resistance against the restoring force.

Figure 12:
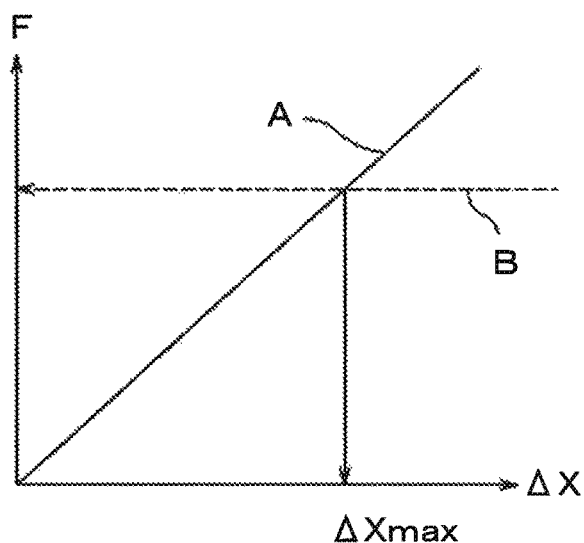
FIG. 12 is a graph representing a relationship between a restoring force and inter-spacer frictional force in the example of the conventional liquid crystal display device.

After removal of the external force from the counter substrate 200, the amount of displacement between the TFT substrate 100 and the counter substrate 200 is still not completely cleared to zero and end up being the amount of displacement at which the restoring force is well balanced with the inter-spacer frictional force (hereinafter, this frictional force is referred to simply as the frictional force). No problem will arise as long as the amount of displacement is of no such a level as to cause unintended color mixing. The frictional force is considered to be greater with increase in the contact area of the spacers. FIG. 12 is a graph representing a relationship between the restoring force and interspacer frictional force in the conventional example. Referring to FIG. 12, a horizontal axis denotes the amount of displacement between the TFT substrate 100 and the counter substrate 200, and a vertical axis denotes the restoring force or the frictional force.

As shown in FIG. 12, the restoring force is proportional to the amount of displacement between the TFT substrate 100 and the counter substrate 200. Solid line A in FIG. 12 represents the proportional relationship. By contrast, the frictional force between the spacers is constant as represented by dotted line B in FIG. 12. Briefly in the conventional example, it can be considered that as shown in FIGS. 8 and 12, the frictional force is constant since the contact area of the upper spacer 20 and the lower spacer 10 remains constant under the displacement between the upper spacer 20 and the lower spacer 10.

The amount of displacement between the TFT substrate 100 and the counter substrate 200 eventually equals to the amount of displacement, ΔXmax, at which the restoring force is balanced with the frictional force. That is to say, ΔXmax in FIG. 12 denotes the amount of displacement at a crossing point of solid line A and dotted line B.

Figure 13:
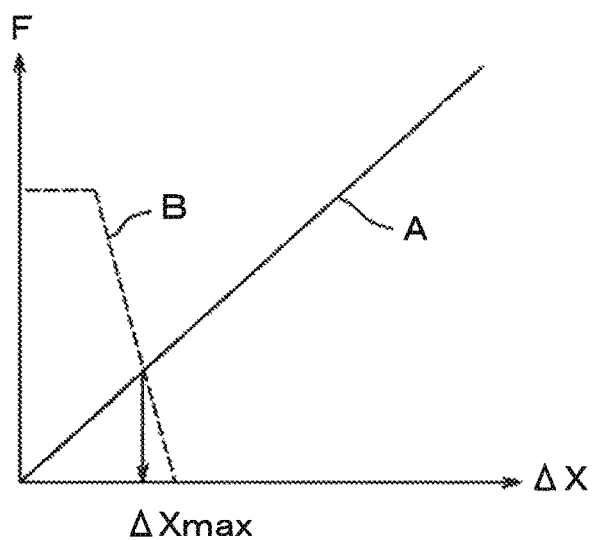
FIG. 13 is a graph representing a relationship between a restoring force and inter-spacer frictional force in the embodiment of the present invention.

FIG. 13 is a graph representing a relationship between a restoring force and frictional force in the embodiment of the present invention. Referring to FIG. 13, a horizontal axis denotes the amount of displacement between the TFT substrate 100 and the counter substrate 200, and a vertical axis denotes the restoring force or the frictional force. Solid line A in FIG. 13 denotes the restoring force. The restoring force, as with that of the conventional example, is proportional to the amount of displacement between the TFT substrate 100 and the counter substrate 200.

The frictional force denoted by a dotted line remains constant until the amount of displacement has reached a certain value, and the frictional force, once it exceeds a certain quantity, diminishes as the amount of displacement increases. This is because, as shown in FIGS. 6 and 7, if the upper spacer 20 moves past the planar section of the lower spacer 10 and becomes displaced from the lower spacer, then as the amount of displacement increases, the contact area decreases and consequently the frictional force also decreases.

The position in FIG. 13 where the restoring force and the frictional force become balanced is ΔXmax. That is to say, a crossing point between solid line A and dotted line B in FIG. 13 is ΔXmax. As can be seen from a comparison between FIGS. 12 and 13, ΔXmax in the embodiment of the present invention is smaller than ΔXmax of the conventional example. This indicates that the amount of displacement after the external force upon the counter substrate has been removed can be made smaller in the embodiment of the present invention. In the embodiment of the present invention, therefore, a degree of unintended color mixing is smaller.

FIG. 14 shows exemplary dimensions of the upper spacer 20 or lower spacer 10 in the embodiment of the present invention. An upper half of FIG. 14 is a plan view of the spacer, and a lower half is a side view thereof. Referring to FIG. 14, a ratio between length 'w1' of the planar section and length 'w2' of the inclined section is not limited. To further enhance the above-described advantageous effects of the present invention, the equation w1<w2 is desirable, and if w1=w2, it follows that for example, w1=w2=5 μm.

Referring to FIG. 14, it is desirable that the width 'd1' of the planar section be 3 μm, for example, and that the width 'd2' of the inclined section at its distal end be smaller. To allow for the more enhanced effectiveness of the present invention and for ease in the formation of the spacers, however, $d1/2 \leq d2 < d1$ is more desirable.

The height 'h2' of the spacer at one end thereof in FIG. 14 needs to be smaller than the height 'h1' at the planar section thereof. To allow for the more enhanced effectiveness of the present invention and for the ease in the formation of the spacers, however, $h1/3 \leq h2 < h1$ is more desirable. A typical example is $h2=h1/2$.

The heights of the upper spacer 20 and the lower spacer 10 can usually be the same. For easier formation of the spacers, the height of the upper spacer 20 is preferably greater than that of the lower spacer 10.

The present invention has been described above assuming that the upper spacer and the lower spacer have the same shape. The shapes of the upper spacer and the lower spacer may however be changed as necessary.

In the present invention, in the case that the TFT substrate and the counter substrate are displaced and consequently the columnar spacers also become out of alignment, the frictional resistance of the columnar spacers to the restoring force attempting to return the columnar spacers to the respective original states is reduced, which in turn allows decrease in residual displacement. As a result, such problems as unintended color mixing and deterioration of display quality due to a change in gap between the substrates are prevented.

What is claimed is:

1. A liquid crystal display device comprising:
    a TFT substrate;
    a counter substrate;
    a liquid crystal sandwiched between the TFT substrate and the counter substrate;
    a first spacer formed between the TFT substrate and the liquid crystal including a first central section having a long axis and a constant width in a direction of the long axis, a first inclined section progressively decreasing in width from the central section toward a distal end of the first inclined section in the direction of the long axis, and a second inclined section progressively decreasing in width from the central section toward a distal end of the second inclined section in the direction of the long axis, in a plan view; and
    a second spacer formed between the counter substrate and the liquid crystal including a second central section having a long axis and a constant width in a direction of the long axis, a third inclined section progressively decreasing in width from the central section toward a distal end of the third inclined section in the direction of the long axis; and a fourth inclined section progressively decreasing in width from the central section, toward a distal end of the fourth inclined section in the direction of the long axis, in a plan view,
    wherein, the first central section has a constant height, the first inclined section progressively decreases in height from the central section toward the distal end in the direction of the long axis, and the second inclined section progressively decreases in height from the central section toward the distal end in the direction of the long axis, in a cross sectional view,
    wherein, the second central section has a constant height, the third inclined section progressively decreases in height from the central section toward the distal end in the direction of the long axis, and the fourth inclined section progressively decreases in height from the central section toward the distal end in the direction of the long axis, in a cross sectional view,
    wherein the long axis of the first spacer and that of the second spacer together form an angle of 90 degrees; and
    wherein a gap between the TFT substrate and the counter substrate is defined by the first spacer and the second spacer,
    wherein a length of the first inclined section and the second inclined section in the direction of the long axis of the first spacer are longer than a length of the first central section in the direction of the long axis of the first spacer, and
    wherein a length of the third inclined section and the fourth inclined section in the direction of the long axis of the second spacer are longer than a length of the second central section in the direction of the long axis of the second spacer.

2. The liquid crystal display device according to claim 1, wherein in a case that the TFT substrate or the counter substrate is not displaced, the first central section and the second central section faces each other.

3. The liquid crystal display device according to claim 1, wherein the first spacer is formed at an intersection of one of gate lines and one of data lines, the one of the gate lines extending in the direction of the long axis of the first spacer.

4. The liquid crystal display device according to claim 1, wherein the height of the first central section is the same as the height of the second central section.

5. The liquid crystal display device according to claim 1, wherein the height of the second central section is greater than the height of the first central section.

6. The liquid crystal display device according to claim 1, wherein, the width of the first central section as d1 and the width of the distal ends of the first inclined section and second inclined section in the direction of the long axis as d2, then $d1/3 \leq d2 < d1$ holds, and
    wherein, the width of the second central section as d3 and the width of the distal ends of the third inclined section and fourth inclined section in the direction of the long axis as d4, then $d3/3 \leq d4 < d3$ holds.

7. The liquid crystal display device according to claim 6, wherein the widths d1 and d3 are equal, and the widths d2 and d4 are equal.

8. The liquid crystal display device according to claim 1, wherein, the height of the first central section as h1 and the height of the distal ends of the first inclined section and second inclined section in the direction of the long axis as h2, then $h1/3 \leq h2 < h1$ holds, and
    wherein, the height of the second central section as h3 and the height of the distal ends of the third inclined section and fourth inclined section in the direction of the long axis as h4, then $h3/3 \leq h4 < h3$ holds.

9. The liquid crystal display device according to claim 8, wherein the heights h1 and h3 are equal, and the heights h2 and h4 are equal.

10. The liquid crystal display device according to claim 1, wherein the counter substrate has a first black matrix extending in the direction of the long axis of the second spacer, and a second black matrix extending in the direction of the long axis of the first spacer.

11. The liquid crystal display device according to claim 10,
    wherein a width of the first central section is less than a width of the second black matrix in a direction perpendicular to the long axis of the first spacer, a width of the second central section is less than a width of the first black matrix in a direction perpendicular to the long axis of the second spacer.

\* \* \* \* \*